Filed May 3, 1968
2 Sheets-Sheet 1
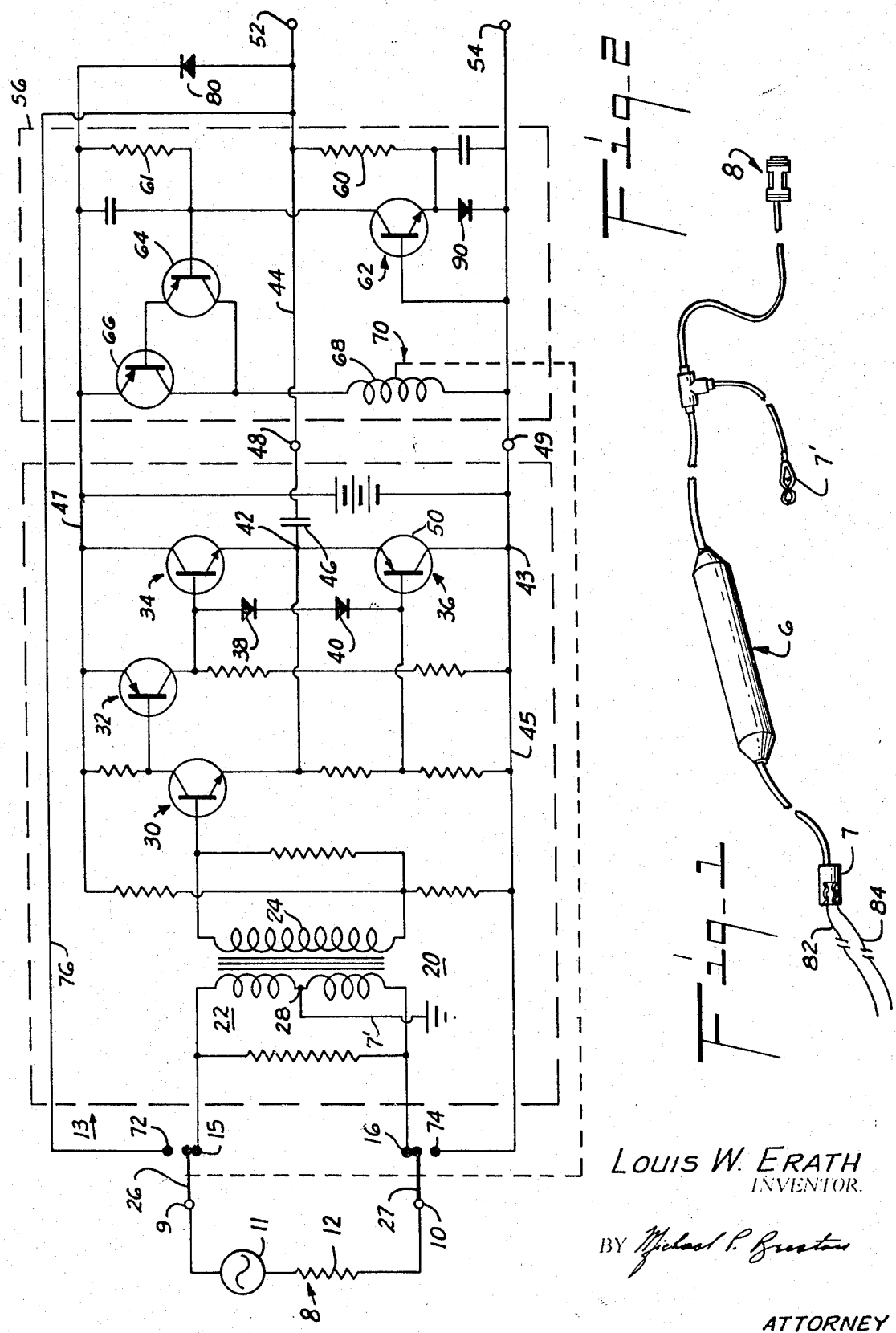
LOUIS W. ERATH
INVENTOR.
BY [signature]
ATTORNEY

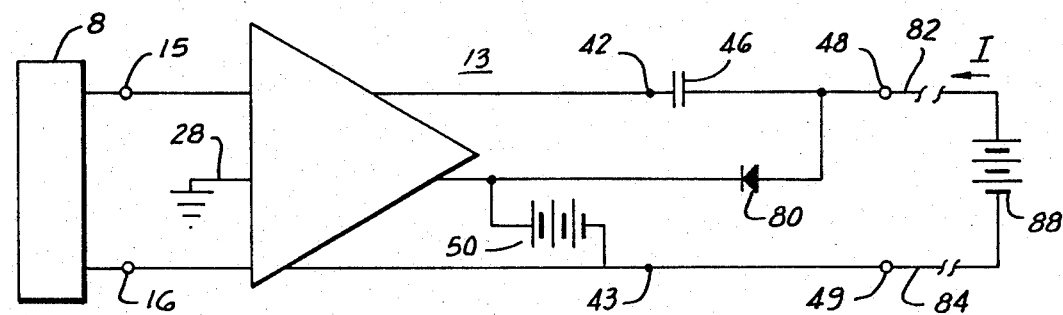
Fig-4
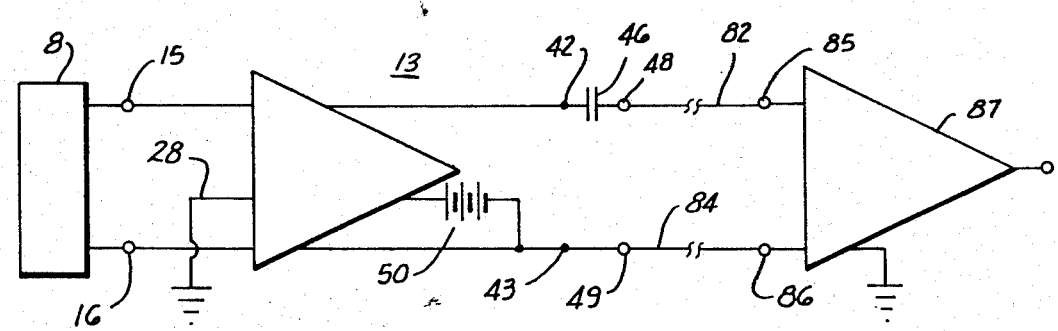
Fig-3
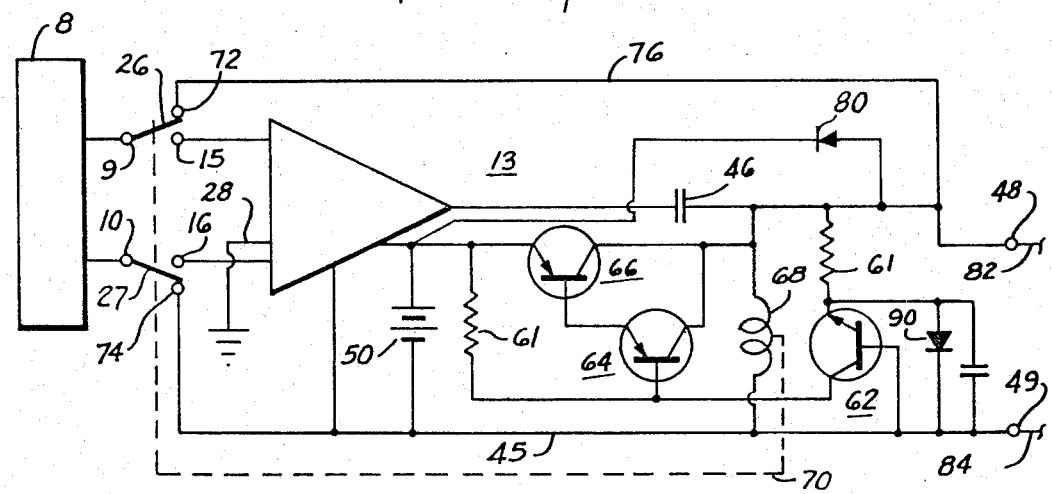
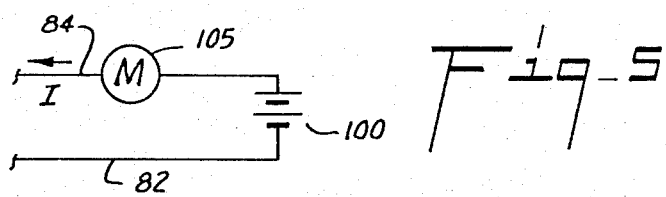
Fig-5
INVENTOR.
LOUIS W. ERATH
BY Michael P. Breston
ATTORNEY United States Patent Office 3,544,877
Patented Dec. 1, 1970

3,544,877
REMOTE SEISMIC PRE-AMPLIFIER SYSTEM
Louis W. Erath, Houston, Tex., assignor to Geo Space Corporation, Houston, Tex., a corporation of Texas
Filed May 3, 1968, Ser. No. 726,442
Int. Cl. H02j 13/00
U.S. Cl. 320—2      8 Claims

ABSTRACT OF THE DISCLOSURE

A self-contained pre-amplifier system for coupling a single pair of long conductors to the output terminals of a remotely positioned alternating current or voltage source having an internal resistance. The system includes a pre-amplifier energized by a rechargeable battery. A first network is coupled to the pre-amplifier to allow the alternating current signal to pass from the pre-amplifier to the conductors. A second network is coupled between the first network and the battery to allow a DC charging current to flow from the conductors to the battery. A third network is coupled between the battery and the conductors to allow a DC current to flow through said source for measuring its internal resistance.

BACKGROUND OF THE INVENTION

In the art of seismic prospecting the trend is to use long arrays of multiple detectors such as geophones and hydrophones. As a result, longer conductors are now required to interconnect the detectors within the arrays and to feed the output signal from the array to suitable recording apparatus. Also, the trend is to use more channels, that is traces per record. These trends can deleteriously affect the operation of the detectors.

To accommodate the increase in the length of the required conductors and in the number of channels, it is desired to use conductors of reduced diameter. Unfortunately, a reduction in the wires' diameter is usually accompanied by an increase in the resistance of the wires. For sufficiently long wires, the resultant resistance becomes appreciable in comparison to the internal resistance of the detectors. Hence, a portion of the power generated by the detectors is wasted in heat through the transmission by the conductors.

Yet another serious problem encountered in using relatively long conductors is attributed to the effect of the conductors' resistance on the damping of the detectors. Different length conductors will have different resistance values. This causes the detectors to have different damping characteristics and hence different response characteristics.

A further drawback in using relatively long conductors is attributed to the generation of hum or noise in the long conductors. It is desired, of course, to cancel the noise and hum from the conductors, else the noise may blanket the seismic signals generated by the detectors as a result of received seismic waves.

SUMMARY OF THE INVENTION

The above and other deleterious effects, caused by the increasing trend of using relatively long conductors for coupling detectors to seismic amplifiers, are remedied by this invention which provides a pre-amplifier system for coupling the detectors to the conductors. The system includes a pre-amplifier energized by a local rechargeable battery. A first network is coupled between the pre-amplifier and the conductors to allow the alternating current to pass from the pre-amplifier to the conductors. A second network is coupled between the conductors and the battery to allow the same conductors, which carry the alternating current signal from the detector to the seismic amplifier, to feed to the battery a charging current. A third network is coupled between the battery and the conductors to allow a current to flow through these same conductors to the detector for checking its internal resistance. Both the charging and checking currents are blocked from flowing through the pre-amplifier.

The use of a pre-amplifier system in accordance with this invention effectively isolates the detectors from the conductors. Such isolation permits ground connections to be made at both the detector locations and the recording station housing the seismic amplifiers. Such grounding connections are effective to greatly attenuate noise and extraneous signals and to provide a safety measure particularly in surroundings close to electrical power distribution centers.

A significant advantage is derived from this invention because it allows the pre-amplifier energizing battery to be charged by the use of the same pair of conductors which carry the detector's output signal. This feature permits overnight battery charging without disturbing the detector array patterns in which the pre-amplifiers are incorporated. Because the same pair of conductors is used for accomplishing three funnctions: to carry the output AC detector signal, to carry the charging current to the battery, and to carry the resistance measuring DC current to the detector, even untrained field personnel can be easily instructed to perform the functions required by the apparatus of this invention.

Other objects and advantages of this invention will become apparent from the following description taken in connection with the accompanying drawings, in which:

FIG. 1 shows a perspective view of the pre-amplifier system;

FIG. 2 shows a circuit diagram of a preferred embodiment of the pre-amplifier system shown in FIG. 1; and FIGS. 3 through 5 show in block diagram form certain features of this invention.

In FIG. 1, the pre-amplifier system generally designated as 6 is shown encased in a plastic housing which is weatherproof. A clip connector 7 feeds the output signal from the pre-amplifier system 6 to a pair of long conductors 82, 84. A spring connector 7' connects to ground. A seismic detector is coupled to the pre-amplifier system 6.

In the figures the detector, generally designated as 8, is typically a geophone or hydrophone. The detector converts received seismic waves into alternating voltage signals appearing at its output terminals 9, 10. The detector is therefore characterized as an AC generating source 11 having an internal resistance 12.

The pre-amplifier generally designated as 13 (enclosed within dotted lines) includes an input center-tapped transformer 20 having a primary winding 22 and a secondary winding 24. The transformer is connected to receive the output signal from detector 8 via relay contacts 26, 27. The center-tapped terminal 28 of primary winding 22 is available for connection to ground through clip 7'. The coupling transformer in one embodiment provides a voltage gain of eight in coupling the output voltage from detector 8 to input transistor 30. The output signal from transistor 30 is applied to transistor 32. The output signal from transistor 32 is direct coupled to transistors 34 and 36 which are driven in phase. The difference in bias potential required to operate transistors 34, 36 is provided by the low impedance diodes 38 and 40 connected in series as shown. Although transistors 34 and 36 are driven in phase, their output signals alternate in phase, because transistor 34 is of the NPN type and transistor 36 of the PNP type. Transistors 34 and 36 therefore operate in push-pull to provide an output to the amplifier's output terminals 42, 43. Terminal 43 is connected to a common line 45. Output terminal 42 is connected to the output conductor 44 via a blocking capacitor 46. Output terminal 42 is also direct-coupled to the emitter of transistor 30 to provide full feedback. Because of this feedback, transistor 30 presents a very high input impedance for transformer 20, and the push-pull transistors 34, 36 present a very low output impedance. Although the net gain of all the transistors was only one, in one embodiment, the transformer gain of eight was sufficiently effective to amplify the signal from detector 8. A local battery 50 is connected between common line 45 and a line 47 to supply to the pre-amplifier and its accessory networks an energizing voltage. For ease of understanding it may be helpful to think of terminals 48 and 49 as being the output terminals of the pre-amplifier 13. The various biasing resistors, diodes and capacitors, are conventional in the amplifier art and no specific mention thereof is being made herein.

Coupled between output terminals 48, 49 of pre-amplifier 13 and the output terminals 52, 54 of the pre-amplifier system 6 are accessory networks (enclosed by dotted lines 56), the functions of which are: to allow the checking of the internal resistance of detector 8, the transmission of the AC signal from detector 8, and the charging of the battery 50.

Network 56 includes a relatively high valued resistor 60 connected to the emitter of a transistor 62. The base of transistor 62 is connected to the common line 45 whereas its collector is connected through a high-valued resistor 61 to line 47. The collector of transistor 62 is also connected to the base of a transistor 64 which is directly coupled to a transistor 66. In the collector circuit of transistor 66 is a coil 68 of a relay 70. Relay 70 actuates contacts 26, 27 between, on one hand, terminals 15, 16 and between, on the other hand, terminals 72, 74. Terminal 72 is connected to terminal 52 via a line 76 whereas terminal 74 is connected to the common line 45. To allow the battery to become charged there is provided a diode 80 polarized as shown between the system's output terminal 52 and line 47. In operation and for a better understanding of the functions of the system 6, reference is made to FIGS. 2 through 5 wherein the pre-amplifier 13 is shown in block form and the same numerals are used to designate identical parts throughout the drawings.

In FIG. 3 is shown the signal transmission system. The alternating signal generated by transducer 8 is fed to the input terminals 15, 16 of amplifier 13. The input signal is amplified by amplifier 13 and appears at the amplifier's output terminals 42, 43. The blocking capacitor 46 allows the AC signal to pass to the system's output terminals 48, 49. Connected to output terminals 48, 49 are a pair of relatively long conductors 82, 84 which transmit the output signal to the input terminals 85, 86 of a suitable seismic amplifier 87 in a recording station.

The system of the present invention acts as an impedance converter for optimum efficiency. As previously mentioned, it offers a relatively high impedance to transducer 8 and a relatively low output impedance to conductors 82, 84. Because the pre-amplifier system 6 can be grounded conveniently at the center-tap 28, spurious signals and noise are greatly attenuated. Since the signal-to-noise ratio is thereby improved, transducers of lesser sensitivity and hence greater ruggedness can be conveniently employed.

The function of the system during the charging operation can be understood with reference to FIG. 4. An external direct-current source 88 feeds a current I into long conductor 82, via diode 80 to the positive terminal of battery 50. Current I is returned to the negative terminal of battery 88 through long conductor 84. It will be appreciated that capacitor 46 effectively blocks the flow of current I into output terminal 42 of pre-amplifier 13. In this manner, transistors 34, 36 are protected from excessive applied charging voltage. During the charging operation diode 90 (in FIG. 2) is also conducting thereby effectively cutting off transistor 62.

Finally, for an understanding of the resistance check operation reference is made to FIG. 5. An external battery source 100 feeds a current I into long conductor 84 to output terminal 49. The negative terminal of battery 100 is connected via long conductor 82 to the other output terminal 48. The polarity of battery 100 causes the transistor 62 to change from the nonconducting to the conducting state. The output current from transistor 62 is directly coupled to transistor 64 and the output current of transistor 64 is directly coupled to transistor 66. The current from the collector of transistor 66 flows into coil 68 of relay 70. Energization of coil 68 actuates relay contacts 26, 27 which connect transducer 8 directly to output terminals 48, 49 via lines 76, 45, respectively. Since battery 100 is directly connected to terminals 48, 49 it becomes also directly connected to detector 8. Since the polarity of the applied voltage to terminals 48, 49 is now opposite to the polarity of the voltage applied to terminals 48, 49 during the charging operation, diodes 80 and 90 become nonconducting. Nonconducting diode 80 thus isolates the battery charging network, and nonconducting diode 90 permits the operation of transistor 62. Again blocking capacitor 46 and diode 80 effectively prevent the DC current of battery 100 from flowing into preamplifier 13 and into battery 50. A meter 105 in series with battery 100 indicates the internal resistance value of detector 8. Since this operation is primarily a continuity check, the accuracy of meter 105 is not too important.

It will be appreciated that the pre-amplifier system of the present invention accomplishes its intended functions with a minimum of components and with maximum reliability and ruggedness.

While the invention has been described in connection with a specific preferred embodiment, it will be apparent that modifications will readily suggest themselves to those skilled in the art. For example, in some applications it may be desired to use a transformer impedance instead of the capacitor impedance 46.

What I claim is:

1. A system for coupling the alternating output signal from a detector to a pair of long conductors, said system including a pair of input terminals and a pair of output terminals connectable to said conductors, said system including:

a pre-amplifier having input and output terminals, said pre-amplifier including a transformer having a center-tapped primary winding, and said input terminals of said pre-amplifier being connected to said transformer;

means connecting said input terminals of said system to the input terminals of said pre-amplifier;

a rechargeable battery operatively connected for energizing said system and for periodically receiving a charging current;

an impedance having at least two terminals;

means connecting said impedance between one output terminal of said pre-amplifier and one output terminal of said system;

means connected to said one terminal of said system and to said battery for conducting said charging current to said battery from an external source coupled to the output terminals of said system through said long conductors; and means for selectively coupling the output signal of said detector to said transformer and to the output terminals of said system, and said selectively coupling means including:

a relay having a coil and movable contacts;

a relay energizing network operatively coupled between said battery and said output terminals of said system; and said energizing network becoming effective upon the application of a DC voltage of suitable polarity to the output terminals of said system, whereby said DC voltage supplies a current through said contacts to said detector for checking the internal resistance of said detector.

2. The system of claim 1 wherein said energizing network includes a transistor amplifier coupled between said battery and said coil.

3. A system for coupling the output signal from a transducer to a pair of long conductors and for allowing the measurement of the internal impedance of said transducer, said system comprising:
at least first and second input terminals,
at least one output terminal,
means connecting said output terminal to said second input terminal,
means including an amplifier connected between said first input terminal and said output terminal, and
control means selectively coupling the output signal of said transducer to said input terminals,
said control means being responsive to a control signal applied through said output terminal whereby the output signal of said transducer becomes coupled to said conductors when said control means is in one state, and said internal impedance becomes susceptible of measurement when said control means is in another state.

4. A system comprising:
a first input terminal,
a second input terminal,
a first output terminal,
a second output terminal,
control means including switching means connected between said first and second output terminals,
said switching means including a first, second, third and fourth terminal;
first means including an amplifier connected between said first output terminal and second switching terminal,
second means connecting said second output terminal with said third switching terminal,
third means connecting said second output terminal with said fourth switching terminal,
fourth means connecting said first output terminal with said first switching terminal,
a first conductor connecting said first input terminal to said switching means,
a second conductor connecting said second input terminal to said switching means,
said switching means having at least a first state and a second state,
said switching means in said first state, connecting said first input terminal to said first means and connecting said second input terminal to said third switching terminal;
said switching means in said second state, connecting said first input terminal to said first switching terminal and connecting said second input terminal to said fourth switching terminal; and
said control means being responsive to a control signal applied between said first and second output terminals for causing said switching means to change states.

5. The system of claim 4 wherein,
said first means includes a direct-current blocking element, and
said second means includes a direct-current blocking element.

6. The system of claim 5 wherein,
said third means is a conductor, and
said fourth means is a conductor.

7. The system of claim 6 wherein,
said control means further includes an amplifier for supplying energy to said switching means.

8. The system of claim 7 and further including,
a network comprising a battery and a direct-current blocking element connected in series, and
said network being connected between said first output terminal and said third means.

References Cited

UNITED STATES PATENTS

| | | | |
|---|---|---|---|
| 3,327,289 | 6/1967 | Goldstein et al. | 340—151 |
| 3,387,198 | 6/1968 | Johnson et al. | 320—14 |
| 3,417,390 | 12/1968 | Turtle | 340—207 |

J D MILLER, Primary Examiner

J. M. GUNTHER, Assistant Examiner

U.S. Cl. X.R.

320—19; 324—57; 340—210, 213